May 15, 1951     R. B. WORFFORD     2,553,157
PAPERBOARD ANIMAL TRAP
Filed Dec. 12, 1947
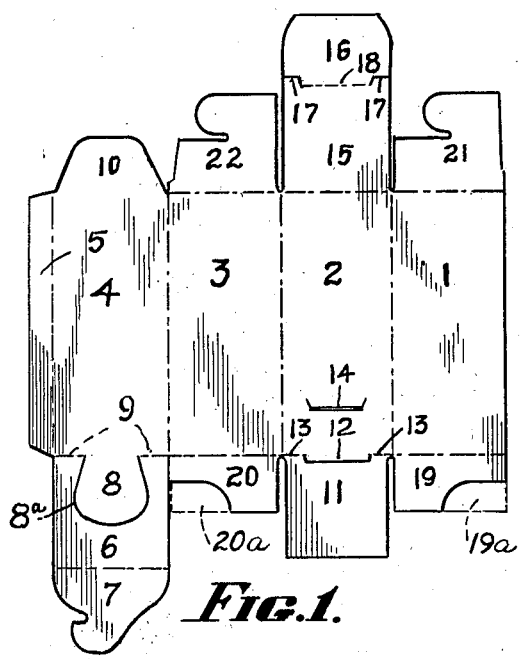
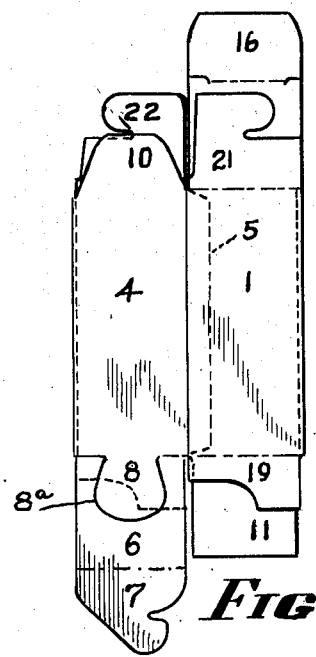
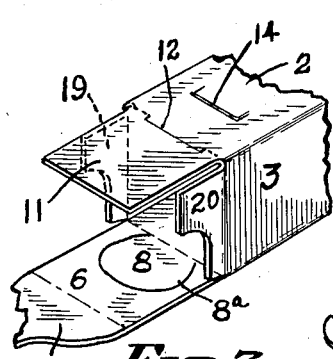
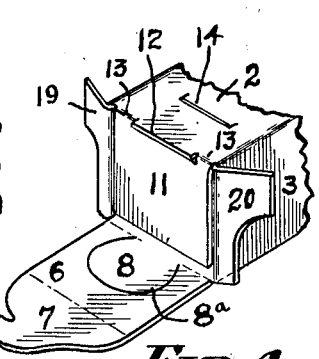
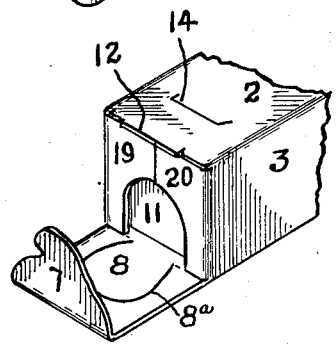
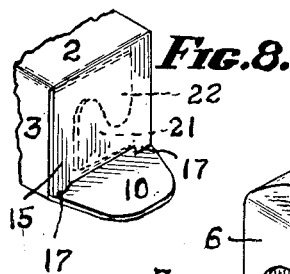
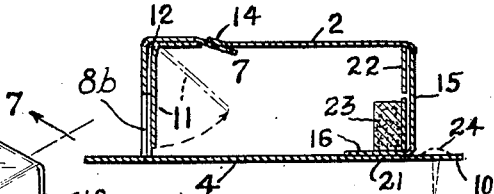
INVENTOR.
ROBERT B. WORFFORD,
BY Allen & Allen
ATTORNEYS.

Patented May 15, 1951

2,553,157

UNITED STATES PATENT OFFICE 2,553,157

PAPERBOARD ANIMAL TRAP

Robert B. Worfford, Cincinnati, Ohio, assignor to The Gardner Board and Carton Co., a corporation of Ohio Application December 12, 1947, Serial No. 791,433

4 Claims. (Cl. 43—64)

My invention relates to the provision of a paperboard trap for animals, especially small rodents of the class of mice and rats. It is a principal object of the invention to provide a single-usage trap disposable along with the body of the trapped animal.

In this way many of the disadvantages of present-day structures are avoided. My trap obviates the inconvenience and physical danger of setting spring devices. It obviates the inconvenience of handling and releasing the bodies of dead rodents, and completely eliminates the danger of disease or infection inherent in coming into contact with such bodies or parts of a mechanical trap which have been in contact therewith. It provides a device in which the body of the trapped animal is completely enclosed and hidden from view, and which may be handled by the housewife not only without danger but without revulsion. It provides a more effective trap for small animals in that it requires a minimum of human handling and hence picks up a minimum of human odor which is thought to warn the rodents away from repeatedly-handled traps of current construction. The provision of a structure possessing these advantages constitutes an object of the invention.

It is an object of the invention to provide a trap which may be made of paperboard by procedures analogous to those employed in the making of knock-down paperboard cartons, and which hence can be made so cheaply as to permit one-time use and disposal.

It is an object of my invention to provide an inexpensive paperboard trap, provided with a poisoned bait, which will effectively entrap and retain a small rodent while the poison is acting upon it.

It is an object of my invention to provide an enclosing trap for small rodents and the like which will also serve as a sanitary means for disposing of the rodent.

It is an object of the invention to provide a trap which is neat and pleasing in appearance.

It is an object of the invention to provide a structure which may be distributed and sold from various distribution points in set-up and operative condition, complete with poisoned bait, thus eliminating the handling of poisons by the user. In this connection it is an object of the invention to provide a structure in which a poisoned bait is completely enclosed and is thus not accessible except to animals small enough to enter the trap.

These and other objects of my invention which will be set forth hereinafter or will be apparent upon reading these specifications, I accomplish by that arrangement of parts of which I shall now describe an exemplary embodiment.

Reference is made to the accompanying drawings wherein:

Figure 1 is a plan view of the single, cut and scored blank from which the trap is constructed in accordance with my invention.

Figure 2 is a plan view of the tubed blank in knocked-down condition.

Figures 3, 4 and 5 illustrate successive steps in the closure of one end of the tubed blank.

Figure 6 is a perspective view of the completed trap.

Figure 7 is a sectional view taken along a line 7—7 of Figure 6.

Figure 8 is a partial perspective illustrating the manner of closing the rear closure flaps, and also showing the rear anchor tab.

Briefly, in the practice of my invention I provide a structure in the nature of a four-sided, tubed, paperboard carton with end closures. One of the end closures has a cut-out portion which serves as a mouth or entrance to the trap. Immediately behind this a resilient panel is provided, which completely closes the entrance hole but which may be swung inwardly by the application of pressure to its outer side. The erected carton is otherwise completely closed. An animal, attracted by the bait placed inside the structure, pushes in on the panel and enters the trap. Once inside, the pressure of the rodent's body on the panel is released, and the panel returns to the closed position by reason of the resilience of the board, closing off the means of escape. While a paperboard carton might not permanently retain the animal, since it is possible to gnaw through the board, the impulse to escape does not arise until a portion at least of the bait has been eaten, and it has been found in practice that the carton acts quite positively to retain the animal until the poison has killed it. Once dead, the animal and trap may both be disposed of in any suitable way.

Referring to Figure 1, I have shown a blank for the exemplary embodiment having enclosing body walls 1, 2, 3 and 4 and a glue flap 5 articulated together by score lines. For purposes of clarity in describing my invention, body wall 4 will be referred to as the bottom wall, body wall 2 as the top wall, the remaining two walls will be known as the side wall members, and the entrance end of the trap will be called the front of the trap.

To one end of bottom member 4 is articulated a closure flap 6, having an interlocking flange element 7 articulated to its opposite end and demarked by a score line. An omega shaped tab 8 is centered in flap 6 with its base lying along the line of articulation between the last mentioned flap and wall member 4. It is formed by the cut line 8a; the line of cut terminating on the line of articulation. Score lines 9 forming the line of articulation for flap 6 run from the outer ends of the base of the last mentioned tab to the outer edges of the flap 6, as shown. When closure flap 6 is infolded along score lines 9 it pulls free of the tab portion 8, which remains in extended position, thus providing the entrance hole 8b (see Figure 7). The line of cut 8a demarks the configuration of the entrance hole 8b in flap 6; the remaining cut out portion forms an anchor tab to secure the trap in position as will be hereinafter set forth. To the opposite end of bottom member 4 another anchor tab 10 is attached, with or without a line of articulation.

An inner flap member 11 which will form the resilient panel is articulated to the edge of top wall 2. A shallow U-shaped line of cut 12 is centered on the line of articulation between top member 2 and flap 11. Cut line 12 is bounded at each end by score lines 13 running to the outer edges of the panel. The length of the cut line 12 is not critical and will be governed by the degree of resilience which it is desired to impart to panel 11. The panel is slightly narrower in width than the top member, and its length is slightly less than the height of the side wall member; so that it will swing freely within the erected carton. The degree of resilience desired is such as will insure a positive return of the flap 11 without offering too much resistance to the entrance of the animal.

A shallow U-shaped slot 14 is shown cut in top wall 2. The base of the U is facing the front edge of the top member and parallel to it. In the erected structure interlocking flange 7 is inserted into the U-shaped slot. To the opposite end of the top member a rear closure flap 15 is attached, said flap having a tuck portion 16 extending from its opposite end and separated from it by the L-shaped lines of cut 17 and score line 18.

Side walls 1 and 3 have opposed flaps 19 and 20 articulated to their respective front edges. The meeting edges of these flaps have portions 19a and 20a (see Figure 1) cut away to correspond substantially with the outline of the entrance hole 8b in closure flap 6. To the opposite ends of the side walls are positioned interlocking flap members 21 and 22 respectively. These flap members are so positioned that their eared portions may be interengaged in the erected carton. The bottom edges of these flaps may be indented along their entire lengths excepting for a small portion of each flap immediately next to the point of juncture with the corresponding body wall. These last mentioned portions form abutments which coact with the lines of cut 17 at the outer edge of rear closure flap 15 to lock flap 15 in the closed position.

It will be understood that the size, shape and number of body walls of the carton, form no limitation upon my invention, and in practice I manufacture the structures in different sizes and of different appropriate weights of board, for animals of different general size, e. g. rats and mice.

The carton blank just described is formed from suitable paperboard stock, which may be printed as desired with decoration, instructions and the like, the cutting and scoring being done on conventional cutting and scoring presses.

The blank of Figure 1 may be tubed in the usual fashion on the usual carton folding and gluing machines. This may be accomplished by folding the blanks on the lines of articulation between body walls 1 and 2 and body walls 3 and 4 accompanied by the adhesive union of the glue flap 5 with the free edge of body wall 1, as is well understood in the art. The result will be the tubular structure illustrated in Figure 2. It is in the knock-down or collapsed condition, and in this condition the collapsed cartons may be shipped from the factory.

In setting up the exemplary embodiment the tubular body of the trap is erected by being squared up in the usual fashion preparatory to effecting the end closures. The closing of the front end closure is illustrated in Figures 3 to 5 inclusive. The erected carton is shown in Figure 3 with the front closure flaps in extended position. The first operation is the inward folding of the resilient panel 11 along the cut line 12 and score lines 13. The next step will be the inward folding of the flaps 19 and 20. The outer closure flap 6 is then infolded along its line of articulation, anchor tab 8 remaining in extended position. Interlocking flange 7 is folded over wall 2 and its end inserted into slot 14 to effect a locking of this end of the carton. It will be noted that the cut out portion of the closure flap which forms the entrance hole lies immediately over the aperture formed by the intermediate flaps and is slightly smaller in dimensions.

In Figure 8 I have illustrated the method of effecting the rear closure. Interlocking side wall extensions 21 and 22 are infolded and interengaged. Closure flap 15 is then folded inwardly over the aforementioned flaps and the extension 16 tucked between the bottom edges of the intermediate, interlocking flaps and the bottom wall. The lines of cut 17 lying along the outer ends of the line of articulation between closure flap 15 and extension 16, are slightly longer than the abutments on the outer ends of the bottom edges of flaps 21 and 22. When closure flap 15 is closed, cuts 17 will lock under the abovementioned abutments. This gives the rear closure flaps a second positive lock, the first being the interlocking of the flaps 21 and 22.

In Figure 6 the erected and closed trap is illustrated in perspective. Interlocking flange 7 is shown inserted in the shallow U-shaped slot 14. Front anchor tab 8 remains in extended position as does the rear anchor tab 10. The moving panel 11 can be seen through the open entrance hole which is just large enough to permit the animal to pass.

The sectional view (Figure 7) illustrates the working of the trap. Poison bait 23 may be cemented or otherwise attached at the rear of the trap. The bait may be supplied by the distributor and placed in the trap prior to the sale of the structure in erected form.

In use, a tack 24 may be pushed through anchor tab 10 to hold the trap firmly to a floor or shelf in a desired location. Another tack may be pushed through the front anchor tab 8 in like manner. Resilient panel 11 is shown in its normal or closed position. Its open position is indicated by dotted lines. A mouse, for example, attracted by the scent of the poisoned bait, enters the trap by pushing on the resilient panel 11.

When the rodent's body has passed beyond the panel, the panel is released, and its resilience causes it to return to the closed position, thus cutting off the only means of egress. The poisoned bait should preferably be one which has a rapid lethal effect. The tack-down anchor tabs act to hold the trap in place as the animal moves the flap 11 in gaining entrance; but they may be omitted if desired and the trap otherwise held or placed against an external abutment.

It will be noted that the trap is characterized by smooth interior surfaces and an absence of reentrant angles. Thus, though the trap is made of paperboard, it is difficult for the animal to gnaw its way out. The trap effectively serves to retain the animal until the poison has taken effect.

While the trap structure may be sold in the knock-down form illustrated in Figure 2, the user performing the erecting operations and inserting the bait, it can more conveniently be sold in set-up form with the bait already in place, from various sales or distribution points. In this event the bait may be fastened in place within the trap to prevent dislodgement if desired. A wide variety of baits and poisons may be employed, and these form no specific limitation on the invention. Traps of my construction may be employed with unpoisoned baits if visited frequently enough to effect disposal of the animals before they can release themselves. It is not beyond the scope of my invention, where desired to employ paperboards or other flexible materials so treated as to make it more difficult or impossible for animals to gnaw their way through the walls thereof. Paperboards which are impregnated or which contain layers impregnated with bitumen, and paperboards which contain or are lined with thin metallic foils or sheets are within this class.

I have described my invention in an embodiment in which the closures employ interlocks or tuck flaps or both; but it is comprised within the invention to provide closures of the seal end type requiring the adhesive union of flaps on one or both ends, within the frame work of the appended claims.

Other modifications may be made in my invention without departing from the spirit of it. Having thus described my invention in an exemplary embodiment, what I claim as new and desire to secure by Letters Patent is:

1. A knock-down tubular carton having body walls in articulation, closure means articulated to the ends of the body walls, one of said closure means being a swingable flap articulated to one of the body walls and of general dimensions slightly less than the end of the carton so as to swing freely within the carton, closure means articulated to adjacent body walls comprising intermediate flaps having opposed portions cut therefrom, said portions forming an aperture when joined, and a body wall opposite said first mentioned body wall having closure means in the form of an outer flap of general dimensions to cover the end of the carton with an entrance hole therein substantially conforming in configuration to the aperture formed by the intermediate flaps, said swingable flap having an intermediate transverse slit adjacent the line of articulation with the corresponding body wall, and score lines connecting the ends of the slit and the side edges of the last mentioned flap, whereby the desired degree of resiliency of said flap may be obtained by varying the length of the slit.

2. The structure claimed in claim 1 wherein the intermediate transverse slit is of shallow U-shaped configuration.

3. A knock-down tubular structure having body walls in articulation and closure means articulated to the ends of said body walls, one of said closure means comprising a swingable flap articulated to one of the body walls and of general dimensions slightly less than the end of the structure so as to swing freely within the structure, and closure means on another of said body walls in the form of a flap of general dimensions to cover the end of said carton with an entrance opening therein, said entrance opening being normally closed by said swingable flap, said swingable flap having an intermediate transverse slit adjacent the line of articulation with the corresponding body wall, and score lines connecting the ends of said slit to the side edges of said last mentioned flap, whereby the desired degree of resiliency of said swingable flap may be obtained by varying the length of said slit.

4. A paperboard structure for the purposes described comprising a body having enclosing wall members, one of said wall members comprising a swingable flap arranged so as to swing freely within said body and articulated to one other of said wall members, said swingable flap having an intermediate transverse slit adjacent the line of articulation with said other wall member, and score lines connecting the ends of said slit to the side edges of said flap, whereby the desired degree of resiliency of said swingable flap may be obtained by varying the length of said slit.

ROBERT B. WORFFORD.

REFERENCES CITED

The following references are of record in the file of this patent:

UNITED STATES PATENTS

| Number | Name | Date |
|---|---|---|
| 586,025 | Gardiner | July 6, 1897 |
| 1,615,200 | Shrum | Jan. 18, 1927 |
| 2,349,605 | Becker | May 23, 1944 |
| 2,559,341 | Weil | Oct. 3, 1944 |
| 2,364,836 | Whitehead | Dec. 12, 1944 |
| 2,368,358 | Hayes | Jan. 30, 1945 |